United States Patent

Matsumoto et al.

[11] Patent Number: 5,352,486
[45] Date of Patent: Oct. 4, 1994

[54] METHOD FOR PRODUCING CARBON MATERIAL COATED WITH CARBON FILM AND THE USE OF CARBON MATERIAL

[75] Inventors: Takashi Matsumoto; Hiroaki Ogura; Osamu Okada; Shinsuke Goda, all of Kagawa, Japan

[73] Assignee: Toyo Tanso Co., Ltd., Osaka, Japan

[21] Appl. No.: 872,400

[22] Filed: Apr. 23, 1992

[30] Foreign Application Priority Data

Aug. 23, 1991 [JP] Japan .................. 3-237338

[51] Int. Cl.⁵ .............................. B05D 3/02
[52] U.S. Cl. ............................ 427/228; 427/377; 427/379; 427/385.5
[58] Field of Search ............... 427/228, 385.5, 379, 427/377

[56] References Cited

U.S. PATENT DOCUMENTS 4,215,161  7/1980  Seibold et al. ............... 427/228
4,490,201 12/1984  Leeds ........................... 427/228
4,508,762  4/1985  Rousseau ...................... 427/228

Primary Examiner—Janyce Bell
Attorney, Agent, or Firm—Armstrong, Westerman, Hattori, McLeland & Naughton

[57] ABSTRACT

There is provided a method for producing a carbon material coated with carbon film comprising the steps of dissolving an aromatic polyamide imide resin in an organic solvent to obtain a solution, applying this solution to a carbon material or impregnating the carbon material with the solution, curing the material at 300 to 400%, and carbonizing and/or graphitizing the material by baking under non-oxidizing atmosphere. There is also provided a carbon material coated with an amorphous carbon film which is a product of thermal decomposition of aromatic polyamide imide.

1 Claim, 2 Drawing Sheets

METHOD FOR PRODUCING CARBON MATERIAL COATED WITH CARBON FILM AND THE USE OF CARBON MATERIAL

BACKGROUND OF THE INVENTION

1. Field of the Invention

The present invention relates to a method for producing a carbon material coated with carbon film and, more particularly, to a method for producing a carbon material preferably applied for producing carbon material or carbon composite material such as mandrels, molds, crucibles for melting metal, jigs for sealing glass, brazing jigs, graphite parts for electric furnace, and dies for continuous casting.

2. Description of the Prior Art

Hitherto, a serious problem has existed regarding the use of carbon or carbon composite materials in that carbon particles may fall off the surface of these materials resulting in pollution of the place where they are used otherwise carbon dust thereof sticks to final product resulting in reduction of productivity. In other words, dust from these materials brings about a troublesome problem, and moreover there arises another problem of environmental sanitation over the workers engaged in carbon industry. Furthermore, because the carbon or carbon composite material may react with metals to produce various carbides, application of these materials to crucibles for melting metals are obliged to be considerably restricted.

As for a method to prevent such carbon or graphite material from the mentioned falling off, it has been proposed to coat the material with pyrocarbon. This method, however, requires very complicated equipment, which is a serious disadvantage in view of industrial productivity. Moreover, in case of certain equipment such as jigs for sealing diode which need fine pores of 0.1 to 1 mm in diameter, this method shows a further disadvantage of unnecessarily filling up the fine pores with pyrocarbon.

As for materials to be used for treating molten metals keeping in contact with them, essential requirements are heat resistance, high thermal conductivity, non-affinity with molten metal, thermal shock resistance, mechanical strength, etc. Electroconductivity, oxidation resistance, impermeability, etc. should be also considered depending upon the situation.

Under such circumstances, it is a recent trend that carbon materials have been widely employed except special applications and, in particular, isotropic graphite material of which the electrical and physical properties are uniform and even is popularly adopted in many applications.

In this respect, it is noted that modern industrial facilities have increasingly required introduction of equipment of new materials under the background of recent remarkable progress in technology, new alloys under the background of diversification of needs, as well as ultra-pure metals under the background of seeking higher performance. As a result, further improvements have been also demanded as to such carbon materials for treating molten metals, in particular, those for use in continuous casting to be employed in such metal production equipments.

As another method, it has been also proposed to coat the material with glass carbon film. Also in this method, there is a disadvantage of filling up the fine pores with glass carbon film.

SUMMARY OF THE INVENTION

The present invention was made to overcome the above-discussed disadvantages of falling off of carbon particles in the carbon or graphite material, and has an object of providing a novel method for preventing such materials from falling off of carbon particles and restricting excessive reaction with metals by improving the surface of the graphite material without unnecessarily filling up the fine pores when such pores are essential, thereby prolonging the life of carbon or graphite parts.

Another object of the invention is to develop a novel carbon material which presents superior characteristics suitable for treating molten metals, in particular, for continuous casting.

In order to accomplish the foregoing object, a method for producing a carbon material coated with carbon film in accordance with the invention comprises the steps of: forming a film of aromatic polyamide imide resin on the surface of carbon or graphite material using a solution of organic solvent of said aromatic polyamide imide resin; curing said film; and carbonizing and/or graphitizing said film by baking it under non-oxidizing atmosphere.

More specifically, the inventors acknowledged through aggressive researches and developments that, in a specified substance of carbon or graphite material coated with a carbon film obtained by the steps of penetrating a specific resin of aromatic polyamide imide resin into, or otherwise applying such resin to, the surface of the carbon or graphite material, curing said film, and carbonizing and/or graphitizing said film, the mentioned problem of falling off of particles is largely reduced to the extent of scarcely producing dust thereof. It was also acknowledged by the inventors that, even in the case of a carbon or graphite material possessing fine pores, the solution of organic solvent of said resin may get into the fine pores without filling them up, desirably leaving the fine pores almost as they are.

It was further acknowledged by the inventors that the mentioned function of preventing the particles from falling off and the function of preventing the fine pores from being filled up are both performed significantly by employing a low concentration of solution of organic solvent of said aromatic polyamide imide resin or employing such a resin of low molecular weight.

It was furthermore acknowledged by the inventors that the mentioned carbon material, in particular, graphite material has superior characteristics quite suitable for continuous casting. In this respect, it was specifically acknowledged that a graphite material of 1.7 to 1.9 in bulk specific density and 2.0 to 0.2 micron in average radius of fine particles is most suitable for continuous casting.

It is essential that the resin used in the invention can sufficiently permeate into the depth of the carbon material to be coated therewith, and fine carbon particles forming the material itself is coated with such resin.

To achieve such sufficient permeation, it is necessary for viscosity of a high molecular solution to be decreased to improve permeability. Such decrease of viscosity can be achieved by either (a) diluting with the use of a large amount of solvent, or (b) employing a small molecular solvent, in other words, a solvent almost in an oligomer state.

As a result of repeated experiments and trials, however, the method (a) shows a disadvantage that only a very small amount of high molecular component is left after removing the solvent by evaporation, and moreover the coating layer itself made of the high molecular component is rather rough having a lot of pores produced after removing the solvent, eventually resulting in poor coating effect. The method (b) also shows a disadvantage that when molecular weight is excessively small, the coated layer is thermally unstable to the extent of occurring decomposition and transpiration even with a little increase of temperature, also resulting in poor coating effect. In this sense, it was recognized that resins having heat resisting property as much as possible are more preferable.

Thus, the inventors gave variations to kind of resin to be employed, molecular weight, concentration of solvent etc. to find out conditions of the most desirable impregnation, thus the present invention having been made.

As a result of various experiments, it was acknowledged that aromatic polyamide imide resin was most preferable to be used in the present invention. Chemical structure of this resin is as follows:

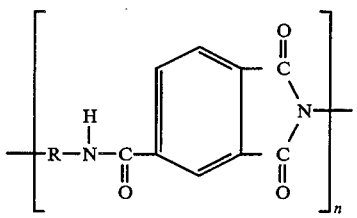

where: R is alkylene group, the alkylene group is $C_1 \sim C_8$, preferably $C_1 \sim C_4$.

This resin is known as one of heat resistant resins like polyimide resin, polybenzimidazole. The resin generally forms a hard but elastic surface, having good adhesive property to both carbon and graphite material, and is not easily separated or peeled off once surface layer is formed. These properties are preferred in the invention.

As for molecular weight, it is preferable the the number of monomers (n of the above chemical structure) is 10 to 100. If molecular weight is increased to 1,000 to 10,000 in the number of monomers, the resin is difficult to dissolve into solvent, and a solution thereof tends to be viscous thereby resulting in poor permeability to carbon or graphite material. On the other hand, if the number of monomers is less than 10, the surface hardness becomes poor and therefore coating effect is also poor. Accordingly, solvents capable of dissolving the mentioned polyamide imide are preferably employed. For example, dimethylacetamide, dimethylformaldehyde, dimethyl sulfoxide, N-methyl-2-pyrolidone, etc. can be employed as preferable solvents.

Concentration of polyamide imide resin in the solvent is different depending upon solvent employed. To maintain a viscosity suitable for spraying and painting in the required surface treatment, concentration of resin component (solid) is 10 to 50%, preferably 20 to 35%. If the percentage of the resin component is excessively small, though viscosity is low and permeability is satisfactory, a resin layer formed after volatilizing the solvent is rough and sealing performance of matrix is poor.

On the contrary, if percentage of resin component is excessively large, the viscosity is too high and the permeability into the matrix is poor. Moreover, the stability in the solvent is insufficient to the extent of appearing opacity, and when applying such solution to a matrix, there arises a problem of undesirable white dots on the coating surface.

There is a correlation between the molecular weight of a resin and the concentration thereof in a solvent and, therefore, the mentioned definition is to be established between molecular weight and concentration of solvent in order to maintain good performance.

Described hereinafter is a method according to the invention in sequential order of production steps.

First, carbon or graphite material is dipped into an organic solvent solution of aromatic polyamide imide resin, otherwise this solution is applied to the mentioned material, so as to be coated with the solution or impregnated partially therewith. The starting material of carbon or graphite employed in this step is not specifically defined but any of known carbon or graphite can be employed. It is, however, preferable to employ isotropic carbon or graphite material as mentioned above. It is also preferable to employ a material of carbon/carbon composite as carbon or graphite material.

In the case of employing the carbon material according to the invention as a material for continuous casting, isotropic graphite matrix is a preferable carbon matrix.

Isotropic graphite herein means a material in which the mechanical, physical and chemical properties of the graphite solid are all uniform in all directions of x-, y- and z-axes, being different from those of ordinary natural graphite material.

In this sense, the isotropic graphite matrix employed in the invention is an artificial composite material, which is produced through the processes of admixing tar or the like with very fine carbon particles, baking it for carbonization, and further baking it under high temperature for graphitization, as disclosed in the Japanese Patent Publication No. 25699/1976, for example.

The graphite matrix employed for such a use is 2.0 to 0.2 micron, preferably 1.8 to 0.7 micron in average radius of the fine pores.

The radius of the fine pores can be measured under normal pressure to 4,000 kg/cm² of pressed-in mercury by mercury press-in method using instruments produced by Carlo Elba, for example.

Bulk specific density is a variable depending upon the degree of graphitization of the graphite matrix, but still is useful as an index of accumulated total space of the fine pores. Accordingly, the bulk specific density is a factor which controls the permeability of high molecule substance.

As a result of repeating various tests, it was recognized that a graphite matrix suitable for continuous casting was 2.2 to 0.2 micron, preferably 1.8 to 0.7 micron, in average radius of fine pores and 1.7 to 1.9 in bulk specific density.

An organic solvent solution of the mentioned resin is applied to or dipped in the mentioned carbon or graphite material. In this step, any of specific methods such as brushing, spraying, dipping or the like can be employed. Application amount of resin is normally 1 to 20 μm, preferably about 5 to 10 μm, in thickness of coating layer (i.e., dry film). Thickness of such a amorphous carbon layer can be measured by SEM (scanning type electron microscope), and the relation between conditions of painting application and thickness of the surface layer can be optimized utilizing the SEM so as to be in the range of 5 to 10 μm, thereafter, application being performed experimentally depending upon conditions at that time. FIG. 2 shows simulations of SEM tomographs of a sample applied to be 40 microns in thickness, and in which (1) is a simulated view of a matrix without application of the solution of resin, while (2) is that of the matrix applied with the solution. Large thickness of coating layer is not necessary, and it is often the case that large thickness is rather undesirable. Then, the resin is heated up to 300° C. to 400° C. to volatilize and remove the solvent, and is cured at the same time. The coating film is then carbonized and further graphitized by baking under a non-oxidizing atmosphere according to a normal process.

As for the conditions of such carbonization and graphitization, any of the conventionally known conditions can be employed as they are, so long as the mentioned resin have been sufficiently cured and graphitized.

In the object carbon material thus obtained, since a carbonized or graphitized film of aromatic polyamide imide resin is securely formed, no peeling off of the fine particles takes place, and no dust in produced, thereby various disadvantages caused by peeling off or production of dust as well as other disadvantages secondary caused thereby being successfully prevented. Furthermore, since the resin is of low molecular weight or the solvent solution is of low concentration (i.e., low viscosity), even in case of a carbon material having fine pores, the pores are substantially prevented from entrance of the solvent and coating therewith, thus the pores being left as they are.

The material coated with carbon film according to the invention is widely applicable or producing carbon or carbon composite material such as mandrels, molds, crucibles for melting metal, jigs for sealing glass, brazing jigs, graphite parts for electric furnace, dies and for continuous casting.

Among the carbon materials according to the invention, graphite material is very preferable to be used as a material for continuous casting. In particular, graphite material is preferably used as a material of die, among all other materials, for continuous casting.

A nozzle for continuous casting may be said a die which is used for drawing a desired shape of metal (solid) product out of a tank containing a molten and, therefore, it is a die (nozzle) with which molten metal is in contact on the starting portion of passage, while solid metal is in contact on the terminal portion, and by which metal products of required configuration are produced through the steps of introducing a molten metal, cooling, halfcaking, and caking.

Accordingly, it is needless to say that materials for continuous casting are exposed to heavier thermal and mechanical loads.

As for the portion to be in contact with molten metal, the chemical reactivity is required to be low, while the portions to be in contact with solid metal is required to be resistant to peeling off caused by sliding frictional forces.

As mentioned so far, in the carbon materials according to the invention, both mechanical strength and resistance to peeling are increased as a result of anchor effect produced at the time of permeation and caking of the high polymer. In particular, as a result of employing a polyamide imide resin capable of forming a film easily, among other high polymers, thereby defining thickness of amorphous carbon layer formed on the surface to be in the range of 5 to 10 microns, it is now possible to form a hard amorphous carbon free from cracks and or a smooth surface. Thus, a carbon composite material for use in continuous casting is accomplished by synergistic effect of combination between employment of such resin and definition of thickness.

Other objects, features and advantages of the invention will become apparent in the course of the following description with reference to the accompanying drawings.

DESCRIPTION OF THE PREFERRED EMBODIMENT

The present invention is hereinafter described in detail showing several examples.

EXAMPLE 1

A carbon material (isotropic graphite material "IG-11" produces by Toyo Tanso Co., Ltd.) was dipped in a n-methyl-2-pyrolidone solvent solution (20% in resin concentration and 1.1 poise in viscosity) of aromatic polyamide imide resin ("AI-10" produced by Obara Chemical Industries) for 30 minutes, then taken out, and liquid adhered thereto was removed. After drying at 300° C., the material was baked at 1,000° C. for 24 hours under a nitrogen gas atmosphere, whereby an object carbon material coated with a carboneous film was obtained. The thickness of this film was 5 μm. No graphite powder was found on the surface of the obtained carbon product, and a finger did not become dirty when touching the surface. Non-existence of graphite powder dust was be also recognized by applying an adhesive tape to the surface of the product and stripping off the tape after leaving the tape applied state as it was. A satisfactory result was obtained after performing this test. In addition, it was recognized that fine pores on this carbon product were not filled up.

EXAMPLE 2

The same solvent solution of the aromatic polyamide imide resin as the foregoing Example 1 was used and wherein concentration was adjusted to 35%, then a series of treatments were carried out in the same manner as the Example 1. A product thus obtained was then subjected to the same graphite peeling off test as above, and substantially the same satisfactory result was obtained.

EXAMPLE 3

A solution prepared by dissolving the polyamide imide resin of Example 1 into an organic solution (35% in concentration) was applied to one side of a graphite material ("IG-11") of 25×25×15 mm in dimensions. After curing at 300° C. by a dryer, this material was subject to carbonizing treatment by heating at 1,000° C. for 24 hours under nitrogen gas atmosphere.

Figure 1:
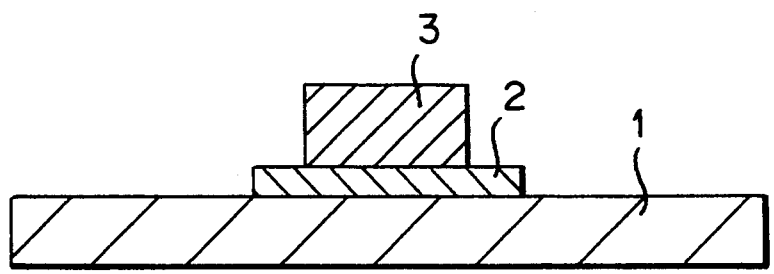
FIG. 1 is an explanatory view of a method for measuring the reaction between graphite material and metal.
Figure 2:
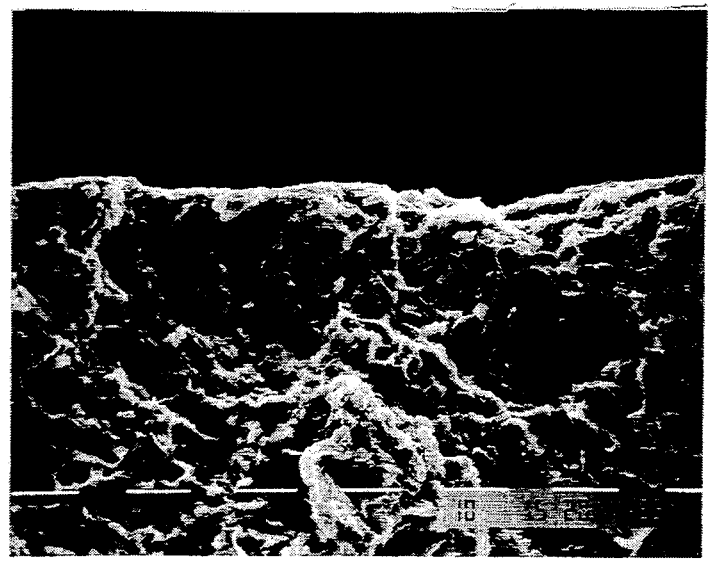
FIGS. 2(1) and 2(2) are a schematic simulated view of a photograph of a carbon composite material taken by a scanning type electron microscope, and in which (1) shows a matrix without coating layer and (2) shows a matrix applied with a coating layer.
Figure 2:
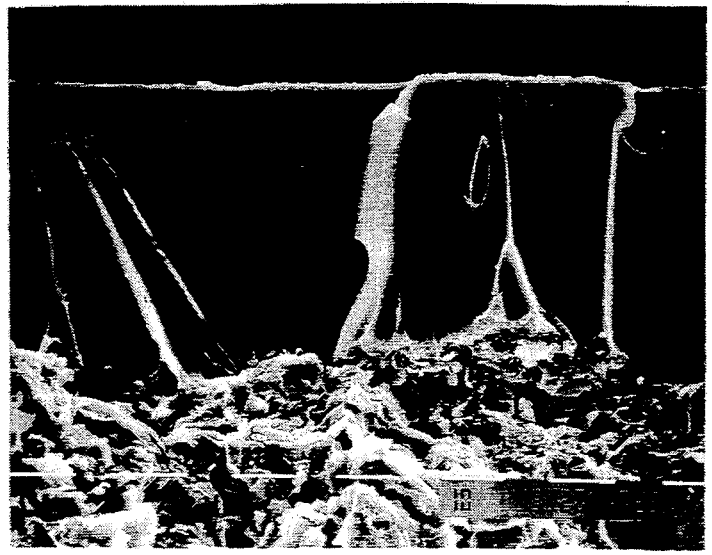

Reactivity with Fe of the obtained graphite material was measured. In this measurement, as shown in FIG. 1, the graphite Material (3) was placed on a steel plate (1)

(10 mm in thickness) putting a copper foil (2) (0.1 mm in thickness) therebetween and facing the resin applied side to the steel plate (1) side. The graphite material thus placed was heated up to 1,100° C. under N gas (20° C./min.), then left for 4 minutes as it was, and cooled down to observe whether or not it adhered (joined).

In this measurement, another graphite material not employing any polyamide imide resin at all was also subjected to the same treatments as above for comparison.

As a result, it was recognized that the former graphite material according to Example 3 did not adhere to the steel plate. On the contrary, the latter graphite material without application of polyamide imide was found securely adhered to the steel plate.

It has been conventionally known that strong joining can be achieved between a graphite material and a steel plate by heating them in a furnace in such a manner as shown in FIG. 1, thereby depositing a specific alloy therebetween. As mentioned above, however, no chemical reaction takes place between the steel plate and the surface to which polyamide imide resin was applied and heat-treated. This means that, as a result of the surface treatment by the method according to the invention, the property of the graphite surface is improved and reaction with certain metals (ferrous metals, for example) is inhibited.

Such technical advantages are very useful in practical use. More specifically, when applying the above surface treatment to jigs for sealing glass, crucibles for melting metal or the like, the advantages or improvement in product quality derived from prevention of peeling off of graphite powder and inhibition of reaction with certain kinds of metals, i.e., prevention of crucible material from deterioration, are desirably performed, eventually resulting in considerable prolongation of life of graphite jigs and crucibles.

EXAMPLE 4

A die for continuous casting (25×25×25 in size) made of an isotropic graphite matrix (produced by Toyo Tanso Co., Ltd. in the grade name of "IG-70") of 1.85 in bulk specific density, 1,000 $\mu\Omega$.cm in electric resistivity and 1.8 micron in radius of fine pores, was dipped in 20% solution of N-methyl-2-pyrolidon of 10 to 100 in number of monomers of polyamide imide resin (produced by Ohara Chemical Industries in the tradename of "AI-10") for one hour to form a film of 5 to 10 microns in thickness. The film was dried at 300° C. and baked at 700° C. for 24 hours for carbonization, whereby a die of composite carbon material was obtained.

Then, continuous castings of nickel copper, chromium copper, and iron bronze were performed with the use of this die. Table 1 shows the results.

EXAMPLE 5

A die made of the same isotropic graphite material as Example 4 was left under a reduced pressure of 1 Torr for one hour, then impregnated with the same polyamide imide resin solution as Example 4 under a pressure of 30 kgf/cm$^2$ for one hour, whereby a film of 5 to 10 microns in thickness was formed, and which was then treated in the same manner as Example 4. Table 1 shows the results. Table 1 shows also results of tests on material for continuous casting commercially available in the market.

TABLE 1

|  | Casting time (hrs) | | |
| --- | --- | --- | --- |
|  | Fe Bronze | Ni Copper | Cr Copper |
| Example 4 | 62 | 18 | 65 |
| Example 5 | 60 | 20 | 60 |
| Material for continuous casting commercially available (D) | 24 | 5 | 20 |

It is clearly understood from the above Table 1 that life of the die impregnated with polyamide imide resin is prolonged as a result of impregnation with polyamide imide as compared with conventionally used graphite dies. Since the life of dies can be prolonged simply by impregnation with polyamide imide resin or application thereof, this advantage is significant also from the viewpoint of cost saving.

EXAMPLE 6

20% solution of 2-methyl-2-pyrolidon of 10 to 100 in number of monomers of polyamide imide resin (produced by Ohara Chemical Industries in the tradename of "AI-10") was applied with a brush evenly to a molten-metal-contacting surface of a die for use in continuous casting (25×25×25 in size) made of an isotropic graphite matrix of 1.77in bulk specific density, 1,100 $\mu\Omega$.cm in electric resistivity and 0.7 micron in radius of fine pores. After acknowledging that the die had been completely permeated with said solution, the same resin solution was applied again to form a film of 8 microns in thickness. The film was dried at 400° C. and heat-treated at 1,500° C. under non-oxidizing atmosphere, whereby a die of composite carbon material was obtained.

Continuous castings for producing various metals shown in Table 2 were performed with the use of this die. Table 2 shows the results.

EXAMPLE 7

In the foregoing Example 6, in the steps of the first application of a solution using a brush and the second application using the brush, a solution of the same resin but 35% in concentration was employed, and in the remaining aspects quite the same treatments as Example 6 were carried out. Table 2 shows the results.

EXAMPLE 8

A die was dipped in the same solution of polyamide imide resin as the foregoing Example 6 without application thereof using brush at all, and in the remaining aspects the same treatments as Example 6 were carried out. Table 2 shows the results.

TABLE 2

|  | Casting time (hrs.) | | | |
| --- | --- | --- | --- | --- |
|  | Pure copper | Ni silver | Si-added phosphor bronze | Be copper |
| Example 6 | 91 | 79 | 56 | 25 |
| Example 7 | 93 | 75 | 55 | 26 |
| Example 8 | 89 | 76 | 58 | 24 |

TABLE 2-continued

| | Casting time (hrs.) | | | |
|---|---|---|---|---|
| | Pure copper | Ni silver | Si-added phosphor bronze | Be copper |
| Material for continuous casting commercially available (D) | 90 | 49 | 20 | 5 |
| Remarks | Difference not found in life, but cast surfaces were smooth except (D) | Partial mirror surface was found even after completing casting | Cracks occured in ingot of (D) during casting | Reaction not found between molten metal and die; life of die extended; surface of cast brillant |

What is claimed is:

1. A method for producing a carbon material coated with carbon film comprising the steps of:

dissolving an aromatic polyamide imide resin in an organic solvent to obtain a solution having a concentration of the aromatic polyamide imide resin of 10 to 50%, said aromatic polyamide imide resin being a resin of low molecular weight of about 10 to 100 in number of monomers; applying said solution to the carbon material or impregnating the carbon material with said solution, said carbon material selected from the group consisting of isotropic carbon, isotropic graphite material and material of a carbon/carbon composite; curing said material at 300° C. to 400° C.; and carbonizing and/or graphitizing said material by baking under a non-oxidizing atmosphere.

* * * * *